United States Patent

Ito et al.

[11] Patent Number: 5,810,442
[45] Date of Patent: Sep. 22, 1998

[54] SEAT ADJUSTING DEVICE FOR ADJUSTING INCLINING ANGLE OF SEAT BACK RELATIVE TO SEAT CUSHION

[75] Inventors: Sadao Ito, Anjo; Hiroshi Nawa, Kariya, both of Japan

[73] Assignee: Aisin Seiki Kabushiki Kaisha, Japan

[21] Appl. No.: 879,707

[22] Filed: Jun. 20, 1997

[30] Foreign Application Priority Data

Jul. 3, 1996 [JP] Japan .................................. 8-173868

[51] Int. Cl.$^6$ ....................................................... B60N 2/02
[52] U.S. Cl. ..................................... 297/362.11; 297/362
[58] Field of Search ........................... 297/362.11, 361.1, 297/374, 362; 475/175, 162; 74/411.5

[56] References Cited

U.S. PATENT DOCUMENTS

| 4,227,741 | 10/1980 | Gross et al. | 297/362 |
| 4,538,855 | 9/1985 | Peetz et al. | 297/362 |
| 4,668,013 | 5/1987 | Wahlmann | 297/362 |
| 5,123,703 | 6/1992 | Morris et al. | 297/362 |
| 5,154,475 | 10/1992 | Kafitz | 297/362 |
| 5,312,158 | 5/1994 | Wittig et al. | 297/362 |

FOREIGN PATENT DOCUMENTS

| 63-47443 | 9/1988 | Japan . |
| 2-24523 | 5/1990 | Japan . |

*Primary Examiner*—Milton Nelson, Jr.
*Attorney, Agent, or Firm*—Finnegan, Henderson, Farabow, Garrett & Dunner, L.L.P.

[57] ABSTRACT

A seat adjusting device for adjusting an incline angle of a seat back relative to a seat cushion. A lower arm engages with a seat cushion and an upper arm engages a seat back. The lower arm has a hinge opening, and the upper arm has an opening eccentric to the hinge opening. A hinge shaft is rotatably inserted through the hinge opening and the eccentric opening and includes a convex portion engageable with the eccentric opening. An inner gear is disposed on one of the lower arm and upper arm, and an outer gear meshes with the inner gear. The outer gear has fewer teeth than the inner gear and is disposed on the other of the lower arm and upper arm. A wedge shaped member is disposed between the eccentric opening and the hinge shaft and is biased by an elastic member.

5 Claims, 4 Drawing Sheets

SEAT ADJUSTING DEVICE FOR ADJUSTING INCLINING ANGLE OF SEAT BACK RELATIVE TO SEAT CUSHION

BACKGROUND OF THE INVENTION

1. Field of the Invention

This invention relates to a seat adjusting device and more particularly to a seat adjusting device for adjusting an incline angle of a seat back relative to a seat cushion of a vehicle.

2. Description of the Related Art

A conventional seat adjusting device for adjusting an incline angle of a seat back relative to a seat cushion of a vehicle is disclosed in Japanese Patent No. 2 (1990)-24523 and Japanese Patent No. 63 (1988)-47443. The disclosed seat adjusting device comprises a lower arm including an outer gear, an upper arm including an inner gear rotatably mounted on the lower arm through a rotating shaft and a pair of biasing members disposed between the upper arm and the rotating shaft and biased by a spring member in order to cancel play between the outer gear and the inner gear.

In accordance with the prior art, when the upper arm is stopped from rotating at an end position of its rotating range by a stopper member engaged with the upper arm, the biasing members are strongly pressed between the upper arm and the rotating shaft. Therefore, the biasing members are worn so as to increase the play between the lower arm and the upper arm.

SUMMARY OF THE PRESENT INVENTION

It is an object of the present invention to provide a seat adjusting device for adjusting an incline angle of a seat back relative to a seat cushion which reduces play between the lower arm and the upper arm.

It is another object of the present invention to provide a seat adjusting device for adjusting an incline angle of a seat back relative to a seat cushion which is inexpensive to manufacture.

It is a further object of the present invention to provide a seat adjusting device for adjusting an incline angle of a seat back relative to a seat cushion which is simple in structure and small in size.

It is a further object of the present invention to provide a seat adjusting device for adjusting an incline angle of a seat back relative to a seat cushion which has durability.

To achieve the above mentioned objects, and in accordance with the purpose of the invention, as embodied and broadly described herein, the seat adjusting device of this invention comprises a lower arm designed to be engaged with a seat cushion, the lower arm having a hinge opening, an upper arm designed to be engaged with a seat back, the upper arm having an eccentric opening eccentric relative to the hinge opening, a hinge shaft rotatably inserted through the hinge opening and the eccentric opening, the hinge shaft having a convex portion engageable with the eccentric opening, an inner gear disposed on one of the lower arm and upper arm, an outer gear meshing with the inner gear, the number of teeth of the outer gear and the inner gear being different, the outer gear disposed on the other of the lower arm and upper arm, a pair of wedge shaped members disposed between the eccentric opening and the hinge shaft and biased by an elastic member, each of said wedge shaped members having a thicker end, and the convex portion of the hinge shaft positioned between the pair of wedge shaped members and adjacent to the thicker end of each wedge shaped member.

BRIEF DESCRIPTION OF THE DRAWINGS

The features and advantages of the seat adjusting device for adjusting an incline angle of a seat back relative to a seat cushion according to the present invention will be more clearly appreciated from the following description in conjunction with the accompanying drawings wherein.

DESCRIPTION OF THE PREFERRED EMBODIMENT

Figure 6:
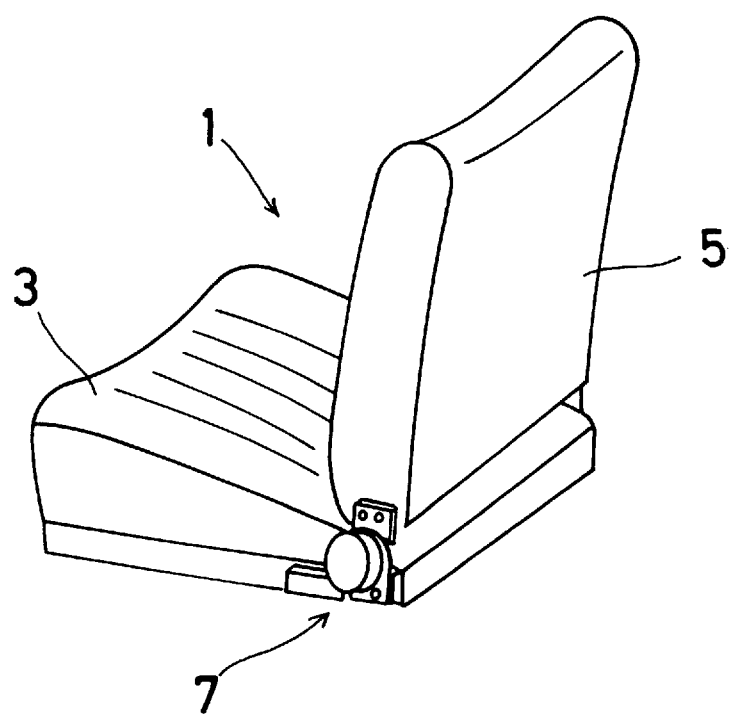
FIG. 6 is perspective view of the vehicle seat on which the seat adjusting device for adjusting an incline angle of a seat back relative to a seat cushion of the present invention is mounted.

FIG. 6 shows a vehicle seat 1 having a seat adjusting device 7 for adjusting an incline angle of a seat back 5 relative to a seat cushion 3. The seat cushion 3 rotatably supports the seat back 5 on the seat cushion 3.

Figure 1:
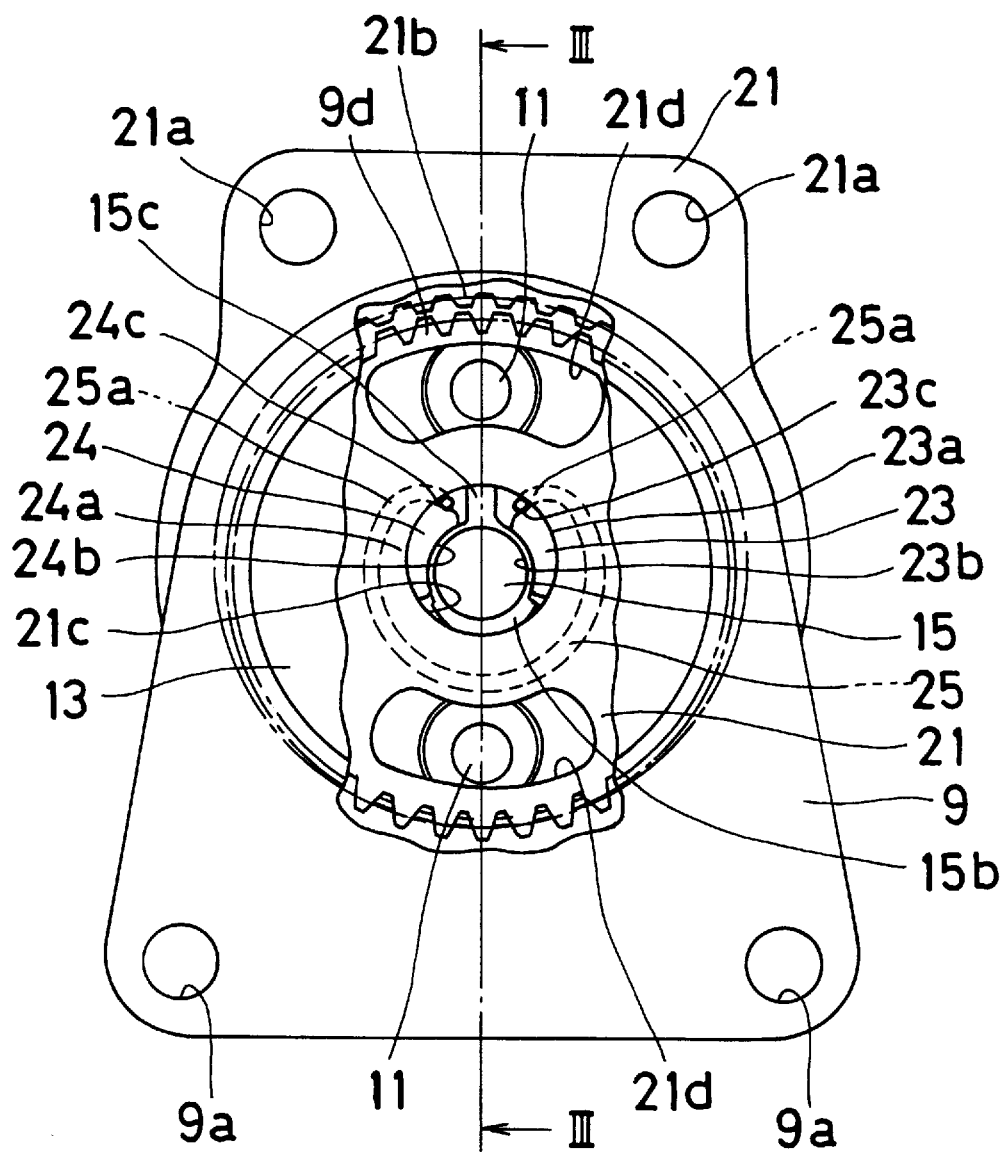
FIG. 1 is side view of the seat adjusting device for adjusting an incline angle of a seat back/relative to a seat cushion of the present invention.
Figure 2:
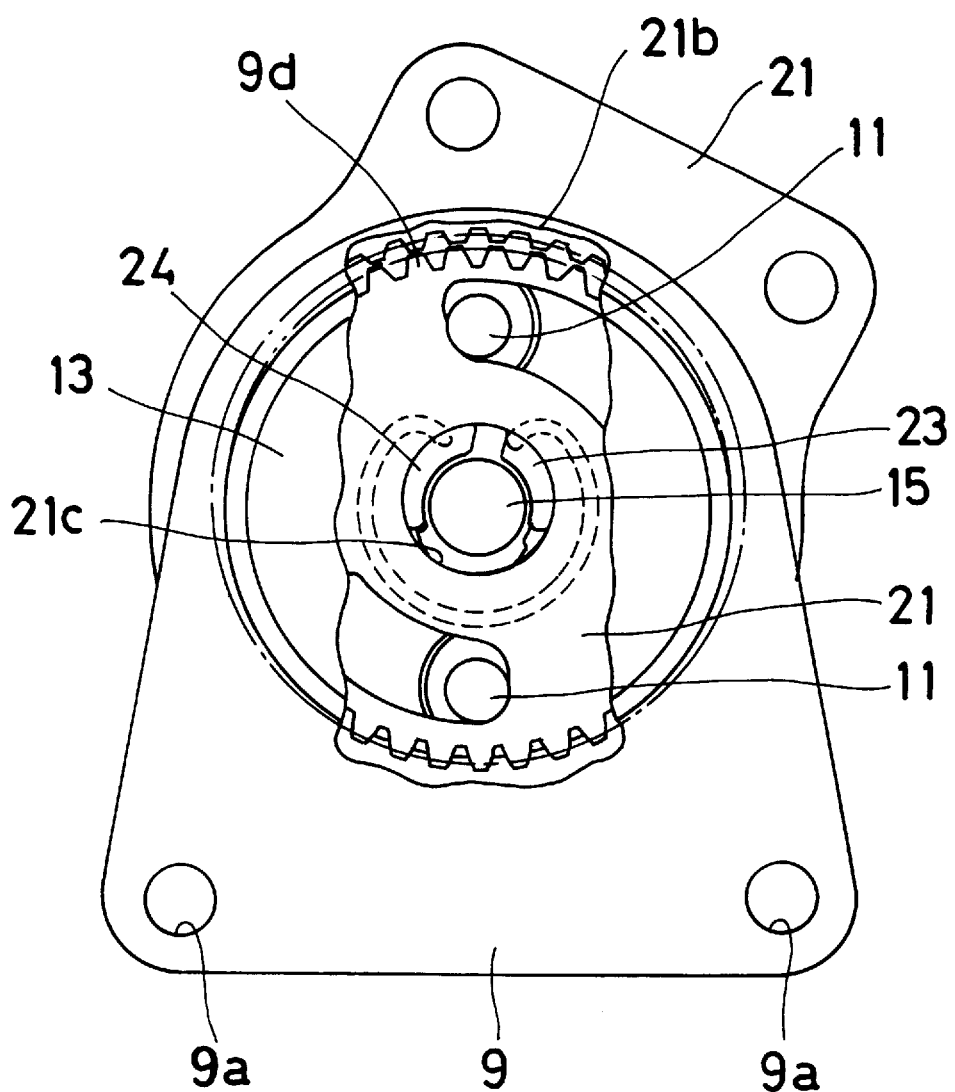
FIG. 2 is side view of the seat adjusting device for adjusting an incline angle of a seat back relative to a seat cushion of the present invention corresponding to FIG. 1 when upper arm is rotated relative to the lower arm.
Figure 3:
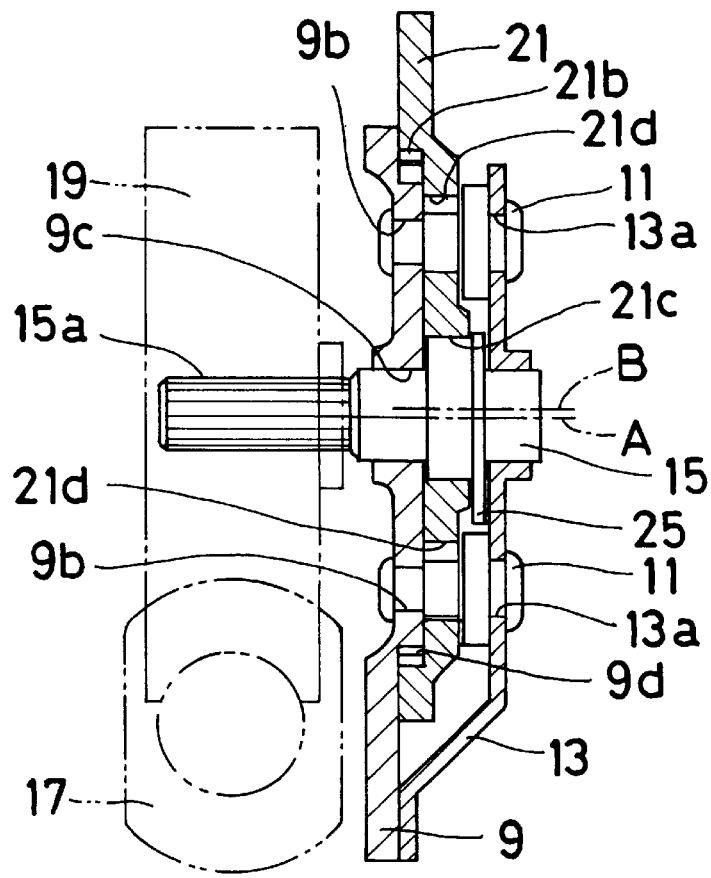
FIG. 3 is a sectional view taken on line III—III of FIG. 1.

Referring to FIGS. 1 to 3, the seat adjusting device 7, for adjusting an incline angle of a seat back relative to a seat cushion, includes a lower arm 9 fixed to a seat cushion frame (not shown in Figures) through mounting openings 9a. The lower arm 9 has a substantially lid-shaped configuration as shown in FIG. 3. Outer gears 9d are disposed on an outer circumferential portion of a stepped portion of the lower arm 9. The lower arm 9 includes a pair of insert holes/channels 9b through which a pair of stopper pins 11 are snugly inserted. Each of the stopper pins 11 is snugly inserted through an opening 13a of a base plate 13 in order to fix the base plate 13 to the lower arm 9.

A hinge shaft 15 is rotatably fit into a hinge opening 9c of the lower arm 9. The hinge shaft 15 includes a spline portion 15a disposed at the left end thereof as shown in FIGS. 3 Through the spline portion 15a, the hinge shaft 15 is connected to a reduction gear mechanism 19 which is linked with an electric motor 17. The hinge shaft 15 is also inserted through the base plate 13.

An upper arm 21 is fixed to a seat back frame (not shown in Figures) of the seat back 5 through a pair of openings 21a. The upper arm 21 has a substantially lid-shaped configuration. Inner gears 21b are disposed on an inner circumferential portion of a stepped portion of the upper arm 21 in order that one of the inner gears 21b is engaged with one of the outer gears 9d of the lower arm 9. The number of teeth of the outer gears 9d is one less than that of the inner gears 21b.

An eccentric opening 21c is disposed on the upper arm 21 so as to be eccentric relative to the hinge opening 9c of the lower arm 9. As shown in FIG. 3, the hinge shaft 15 is inserted through the eccentric opening 21c. A pair of wedge shaped members 23, 24 are disposed between the eccentric opening relative to a rotation axis A of the hinge shaft 15.

As shown in FIG. 1, outer portions 23a, 24a and inner portions 23b, 24b of the wedge shaped members 23, 24 have a circumferentially-shaped configuration so as to be engaged with the eccentric opening 21c of the upper arm 21 and the outer circumferential portion of the hinge shaft 15 respectively. Each of the wedge shaped members 23, 24 slowly narrows from one end to the other end thereof. Further, each of the wedge shaped members 23, 24 is disposed between the eccentric opening 21c and the hinge shaft 15 so that each of one end and the other end thereof may be opposite to each other.

The wedge shaped members 23, 24 respectively include stepped portions 23c, 24c each of which is engaged with an end of a spring 25. The wedge shaped members 23, 24 are biased in the lower direction in FIG. 1 by the spring 25.

The hinge shaft 15 includes an engaging portion 15b so as to be disposed between the other ends of the wedge shaped members 23, 24. Further, the hinge shaft 15 includes a convex portion 15c so as to be disposed between ends of the wedge shaped members 23, 24. Each of the engaging portion 15b and the convex portion 15c is provided so as to be usually disengaged from the eccentric opening 21c.

The upper arm 21 includes a pair of crescent shaped openings 21d through which the stopper pins 11 are inserted in order to restrict the rotational range of the upper arm 21 relative to the lower arm 9.

In accordance with FIGS. 4 and 5, an operation of the seat adjusting device for adjusting an incline angle of a seat back relative to a seat cushion of the present invention will be described hereinafter. When a seat passenger operates an operating member (not shown in Figures), in order to change an incline angle of the seat back 5 relative to the seat cushion 3, the electric motor 17 starts driving in order to rotate the hinge shaft 15 through the reduction gear mechanism 19.

Figure 4:
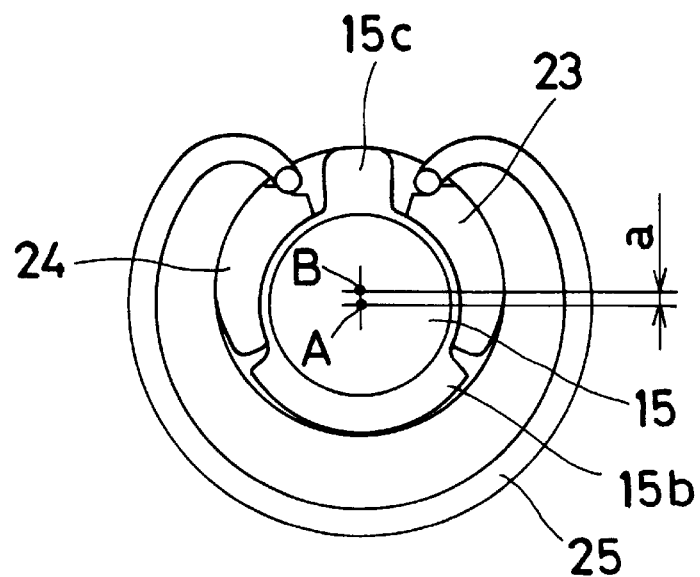
FIG. 4 is an enlarged view of details of the hinge shaft.
Figure 5:
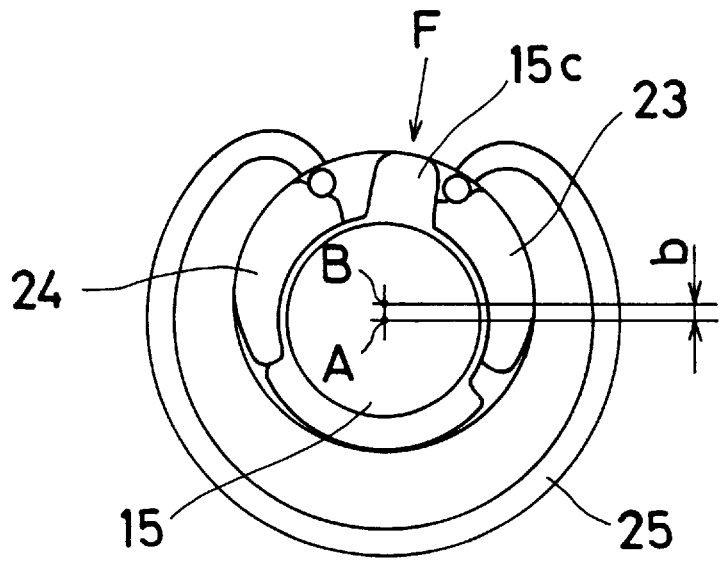
FIG. 5 is an enlarged view of details of the hinge shaft corresponding to FIG. 4 when the upper arm is stopped from rotating.

In FIG. 4, when the hinge shaft 15 is rotated in the clockwise direction, the convex portion 15c forces the wedge shaped member 23, and the engaging portion 15b forces the wedge shaped member 24. The wedge shaped members 23, 24 and the spring 25 are rotated in the clockwise direction in FIG. 4 with the hinge shaft 15.

As shown in FIGS. 3 and 4, owing to the shape of the wedge shaped members 23, 24, the eccentric opening 21c of the upper arm 21 keeps being eccentric relative to the hinge opening 9c of the lower arm 9 in order that the upper arm 21 is swung relative to the lower arm 9 so as to change the eccentric direction of the eccentric opening 21c relative to the hinge opening 9c. Therefore, an engaging portion of the outer gears 9d of the lower arm 9 and the inner gears 21b of the upper arm 21 move circumferentially. Since the number of teeth of the outer gear 9d of the lower arm 9 is one less than that of the inner gear 21b of the upper arm 21, the upper arm 21 slowly inclines relative to the lower arm 9.

The length of distance "a" between centers A, B of the hinge opening 9c of the lower arm 9 and the eccentric opening 21c of the upper arm 21 is shown in FIG. 4. When the upper arm 21 rotates relative to the lower arm 9, the convex portion 15c of the hinge shaft 15 is not in contact with the eccentric opening 21c. Since the wedge shaped members 23, 24 are forced by the spring 25, the upper arm 21 is biased in one direction so as to cancel the play between the engaging portion between the outer gear 9d of the lower arm 9 and the inner gear 21b of the upper arm 9.

When the stopper pins 11 engage with the ends of the crescent shaped openings 21d of the upper arm 21, the upper arm 21 cannot incline relative to the lower arm 9 any more. When the upper arm 21 is stopped inclining relative to the lower arm 9, stress generated at the engaging portion between the outer gear 9d and the inner gear 21b forces the upper arm 21 as a reaction force F (shown in FIG. 5) so as to disengage the outer gear 9d from the inner gear 21b.

At this time, the length of the distance "b" between the centers A, B of the eccentric opening 21c of the upper arm 21 and the hinge shaft 15 is less than "a". Therefore, since the inner circumferential portion of the eccentric opening 21c engages with the convex portion 15c of the hinge shaft 15, the convex portion 15c supports a part of the reaction force F applied form the upper arm 21 so as to reduce the strain applied to the wedge shaped members 23, 24 from the upper arm 21. Therefore, the wear of the wedge shaped members 23, 24 is reduced.

The electric motor 17 may be stopped by a controller (not shown in Figures) which detects the amount of a current flowing into the electric motor 17 when the upper arm 21 is stopped in relative to the lower arm 9. Otherwise, the electric motor 17 may be stopped by the operation of the seat passenger.

While the invention has been particularly shown and described with reference to the preferred embodiments thereof, it will be understood by those skilled in the art that the foregoing and other changes in form and details can be made therein without departing from the spirit and scope of this invention.

What is claimed is:

1. A seat adjusting device for use in adjusting an angle between a seat back and a seat cushion, comprising:

a lower arm designed to be engaged with the seat cushion, the lower arm having a hinge opening;

an upper arm designed to be engaged with the seat back, the upper arm having an eccentric opening eccentric relative to the hinge opening;

a hinge shaft rotatably inserted through the hinge opening and the eccentric opening, the hinge shaft having a convex portion engageable with the eccentric opening;

an inner gear disposed on one of the lower arm and the upper arm;

an outer gear meshed with the inner gear, the number of teeth of the outer gear and the inner gear being different, the outer gear disposed on the other of the lower arm and the upper arm;

a pair of wedge shaped members disposed between the eccentric opening and the hinge shaft and biased by an elastic member, each of the wedge shaped members having a thicker end; and the convex portion of the hinge shaft positioned between the pair of wedge shaped members and adjacent to the thicker end of each wedge shaped member.

2. A seat adjusting device as recited in claim 1, wherein one of the lower arm and upper arm includes an engaging opening, the other one of the lower arm and upper arm includes a stopper pin fixed thereto, and the stopper pin being inserted through the engaging opening to make the stopper pin engageable with one end of the engaging opening.

3. A seat adjusting device as recited in claim 1, wherein the hinge shaft further includes an engaging portion between the wedge shaped members.

4. A seat adjusting device as recited in claim 1, further comprising a motor operatively connected to the hinge shaft.

5. A seat adjusting device as recited in claim 1, wherein the number of teeth of the inner gear being greater than that of the outer gear.

* * * * *